(12) United States Patent
Mallinson (10) Patent No.: US 12,063,055 B2
(45) Date of Patent: Aug. 13, 2024

(54) FAST FOURIER TRANSFORM IN ANALOG DOMAIN

(71) Applicant: SiliconIntervention Inc., Kelowna (CA)

(72) Inventor: A. Martin Mallinson, Kelowna (CA)

(73) Assignee: SiliconIntervention Inc., Kelowna (CA)

( * ) Notice: Subject to any disclaimer, the term of this patent is extended or adjusted under 35 U.S.C. 154(b) by 133 days.

(21) Appl. No.: 18/077,788

(22) Filed: Dec. 8, 2022

(65) Prior Publication Data

US 2023/0188168 A1 Jun. 15, 2023

Related U.S. Application Data

(60) Provisional application No. 63/288,644, filed on Dec. 12, 2021, provisional application No. 63/287,470, filed on Dec. 8, 2021.

(51) Int. Cl.
*H04B 1/04* (2006.01)
*G06F 17/14* (2006.01)
*H03F 3/00* (2006.01)
*H03F 3/16* (2006.01)

(52) U.S. Cl.
CPC .................. *H04B 1/04* (2013.01)

(58) Field of Classification Search
None
See application file for complete search history.

(56) References Cited

U.S. PATENT DOCUMENTS

| 8,228,971 | B2* | 7/2012 | Arviv | H04B 1/7075 |
| | | | | 375/150 |
| 8,497,743 | B2* | 7/2013 | Dent | H01Q 25/007 |
| | | | | 333/24 C |
| 9,077,455 | B2* | 7/2015 | Randel | H04B 10/616 |
| 9,369,213 | B1* | 6/2016 | Kakande | H04L 25/03331 |
| 10,177,947 | B2* | 1/2019 | Agee | H04B 7/0617 |
| 2022/0224420 | A1* | 7/2022 | Torbatian | H04L 25/03305 |

FOREIGN PATENT DOCUMENTS

CN 110247710 A * 9/2019
CN 113517942 A * 10/2021

* cited by examiner

*Primary Examiner* — Pablo N Tran
(74) *Attorney, Agent, or Firm* — Gard & Kaslow LLP

(57) ABSTRACT

An apparatus and method for performing a fast Fourier transform in the analog domain with passive components. A complex analog signal that is shift and scale invariant is derived from analog circuit properties. A butterfly circuit processes such signals using only passive components by mapping the Kirchhoff current and voltage laws into operations on the signals. A fast Fourier transform circuit of any desired width is constructed from such butterfly circuits. The passive networks require no power as the operations are on the presented signal; energy is taken from the source signal so no battery or power supply is needed. Thus, when the signal becomes quiescent, the power consumed is zero. Further there is no need of a clock or other timing device; rather, it is the operation of Kirchhoff laws in the network, which apply essentially upon arrival of the signal, that is made analogous to the desired operation.

16 Claims, 9 Drawing Sheets

FAST FOURIER TRANSFORM IN ANALOG DOMAIN

This application claims priority from Provisional Application Nos. 63/287,470, filed Dec. 8, 2021, and 63/288,644, filed Dec. 12, 2021, each of which is incorporated by reference herein in its entirety.

FIELD OF THE INVENTION

The present invention relates generally to signal processing circuits, and more specifically to circuits for processing Fourier transforms.

BACKGROUND OF THE INVENTION

The Fourier transform (FT) is a well-known mathematical tool. A Fourier transform converts a signal from its original domain (often time or space) into a representation in the frequency domain and vice versa. The FT operation by definition examines a continuous amplitude signal for an infinite time (or space) correlating the variation over that infinite interval against a given frequency of rotation of a unit vector in phase space. The discrete Fourier transform (DFT) differs from the FT by taking equally spaced discrete samples of the signal over time (or space) and correlating those samples against a set of similarly discrete samples of a rotating unit vector. Being discrete, well-known artifacts arise as described by Nyquist's sampling theorem. An obvious practical limitation of both the FT and the DFT is that the interval of time (or space) cannot be infinite, which implies that the DFT is operating on a finite set of samples. Correlation against the rotating unit vector results in one frequency point: that is, the correlation operation must be repeated for each frequency point of interest. This operation is useful in many fields but computing it directly from the definition is often too slow to be practical.

A fast Fourier transform (FFT) rapidly computes such transformations by recognizing that after calculating the correlation for a given frequency, certain intermediate steps of that calculation are repeated unnecessarily for a second frequency correlation. Thus, knowing that a certain set of output frequencies are to be calculated, the FFT executes the minimum number of intermediate calculations and makes optimum use them to construct the set of output frequencies concurrently. As a result, it manages to reduce the complexity of computing the DFT from the order of $N^2$ operations, which arises if one simply applies the definition of the DFT, to the order of N log N operations, where N is the data size. The difference in speed between the DFT and the FFT can be enormous, especially for long data sets where N may be in the thousands or millions.

By far the most commonly used FFT is the Cooley-Tukey algorithm. The Cooley-Tukey algorithm is a "divide and conquer" algorithm that recursively breaks down a DFT of any composite size $N=N_1N_2$ into many smaller DFTs of sizes $N_1$ and $N_2$ along with an order of N multiplications by complex roots of unity, i.e., factors that when multiplied together result in a value of −1; these complex roots of unity are traditionally called twiddle factors.

The best known use of the Cooley-Tukey algorithm is to divide the transform into two pieces of size N/2 at each step. The basic circuit used with the Cooley-Tukey algorithm is the well-known "Radix-2 butterfly" circuit that processes complex numbers.

Fourier transforms, and FFTs, are typically done with digital circuits having active devices that require power to operate. In some instances, however, the processing of analog signals has advantages over digital signal processing. Thus, it is desirable to be able to perform FFTs using only analog components.

SUMMARY OF THE INVENTION

Described herein is an apparatus and method for performing a fast Fourier transform in the analog domain with passive components.

One embodiment discloses a circuit configured to perform a butterfly operation on a first complex input signal and a second complex input signal and output a first complex output signal and a second complex output signal, each input and output signal defined by eight analog circuit properties, four of the analog circuit properties of each input or output signal defining a real part of the respective input or output signal and four of the analog circuit properties of each input or output signal defining an imaginary part of the respective input or output signal, the circuit comprising: a first plurality of passive two-port elements configured to receive the eight analog circuit properties of the first complex input signal and the eight analog circuit properties of the second complex input signal and generate the four analog circuit properties defining the real part of the first complex output signal; a second plurality of passive two-port elements configured to receive the eight analog circuit properties of the first complex input signal and the eight analog circuit properties of the second complex input signal and generate the four analog circuit properties defining the imaginary part of the first complex output signal; a third plurality of passive two-port elements configured to receive the eight analog circuit properties of the first complex input signal and the eight analog circuit properties of the second complex input signal and generate the four analog circuit properties defining the real part of the second complex output signal; a fourth plurality of passive two-port elements configured to receive the eight analog circuit properties of the first complex input signal and the eight analog circuit properties of the second complex input signal and generate the four analog circuit properties defining the imaginary part of the second complex output signal; wherein values of the passive two-port elements in each of the four pluralities of passive two-port elements are defined such that: the first complex output signal is a sum of the first complex input signal multiplied by a twiddle factor and the second complex input signal multiplied by a conjugate of the twiddle factor; and the second complex output signal is a difference between the first complex input signal multiplied by the twiddle factor and the second complex input signal multiplied by the conjugate of the twiddle factor.

Another embodiment discloses method of performing a butterfly operation on a first complex input signal and a second complex input signal to produce a first complex output signal and a second complex output signal, each input and output signal defined by eight analog circuit properties, four of the analog circuit properties of each input or output signal defining a real part of the signal and four of the analog circuit properties of each input or output signal defining an imaginary part of the respective input or output signal, the method comprising: generating the four analog circuit properties defining the real part of the first complex output signal by passing the eight analog circuit properties of the first complex input signal and the eight analog circuit properties of the second complex input signal through a first plurality of passive two-port elements; generating the four analog circuit properties defining the imaginary part of the first complex output signal by passing the eight analog circuit properties of the first complex input signal and the eight analog circuit properties of the second complex input signal through a second plurality of passive two-port elements; generating the four analog circuit properties defining the real part of the second complex output signal by passing the eight analog circuit properties of the first complex input signal and the eight analog circuit properties of the second complex input signal through a third plurality of passive two-port elements; generating the four analog circuit properties defining the imaginary part of the second complex output signal by passing the eight analog circuit properties of the first complex input signal and the eight analog circuit properties of the second complex input signal through a fourth plurality of passive two-port elements; wherein values of the passive two-port elements are selected such that: the first complex output signal is a sum of the first complex input signal multiplied by a twiddle factor and the second complex input signal multiplied by a conjugate of the twiddle factor; and the second complex output signal is a difference between the first complex input signal multiplied by the twiddle factor and the second complex input signal multiplied by the conjugate of the twiddle factor.

DETAILED DESCRIPTION OF THE INVENTION

Described herein is an apparatus and method for performing a fast Fourier transform in the analog domain with analog components, rather than in the digital domain as is done in conventional digital signal processing.

The present approach differs from typical Fourier transform processing by using "butterfly" circuits in a way similar to that of the digital signal paradigm but without quantizing the analog properties. The present approach operates on an analog signal determined from signal properties, such as voltages, currents, charge, pulse density, time, or other parameters. The signal is constructed in a way that it is shift and scale invariant; this can remove any effect of the properties, such as common mode noise, absolute voltage or current level, finite settling time, etc., on the signal.

The use of shift and scale invariant signals also allows for mathematical manipulation of the signal using only passive components. By mapping the Kirchhoff current and voltage laws into operations on the analog signals, it is possible to construct circuits that perform a fast Fourier transform in the analog domain.

Processing analog signals as in the present approach also provides certain advantages over digital signal processing, particularly in power consumption. The passive networks used in the present approach require no power to operate as the operations are on the signal presented to the network and energy is taken from the source signal; no battery or power supply is needed. Thus, when the signal becomes quiescent, the power consumed is zero. Further there is no need of a clock or other timing device; rather, it is the operation of Kirchhoff laws in the network that is made analogous to the desired operation and these laws apply essentially instantly upon arrival of the signal.

The signal formulation used herein is the encoding of a real number on four analog properties derived from an analog property that is input to the circuit in a way that the signal so encoded is both shift and scale invariant with respect to the properties. It will be apparent that eight properties can similarly encode a complex number in the same way as the real numbers described herein, since a complex number is the sum of two real numbers, one multiplied by i, the square root of −1.

Consider a signal S represented by a formulation of four analog properties A, B, C, and D. For example purposes, it is assumed herein that these are the voltage properties of four wires, with A the voltage on a first wire a, B the voltage on a second wire b, etc. However, as above, other analog properties may be used. The signal S is defined as:

$$S = \frac{A-B+C-D}{A-B-C+D} \quad \text{Equation 1}$$

It may be seen that this may also be expressed as a function of two differential signals P1 and P2, as S=(P1−P2)/(P1+P2), or the inverse.

This formulation is both shift and scale invariant. Shift invariance means that adding some factor X to each property does not change the signal; it will be apparent from Equation 1 that if A becomes A+X, B becomes B+X, etc., the signal S will not change since all of the X terms will cancel out in both the numerator and denominator.

Scale invariance means that multiplying each property by some factor Y will also not change the signal. Again, it is apparent from Equation 1 that if each property is multiplied by the same factor Y, both the numerator and denominator will be multiplied by Y, again canceling out and having no effect on the signal S.

An important effect of scale invariance is that a scale invariant signal becomes independent of the settling time of the circuit. Consider a single pole filter response Y to a step of amplitude A:

$$Y(t) = A \cdot (1 - e^{-t/\tau})$$

which is an asymptotic approach over time to the step size A such that, after one time constant $\tau$, the value of Y will be 0.632 times A. If all of the analog properties are subject to the same settling time and they are sampled by a succeeding stage after the same delay, each is in error by the same multiplicative factor. The same argument applies for any time elapsed; one time constant is only one example Since the formulation of the signal from the properties can tolerate any linear operation, the signal, which again is distinct from the properties, does not experience the delay, and the circuit property need not settle in order to determine the signal.

Deriving a signal in this way from multiple analog properties allows addition (and thus subtraction by the inverse) and division (and hence multiplication by the inverse) of signals derived from transducers and similar devices. Consider how such operations are achieved in the known art.

Figure 1:
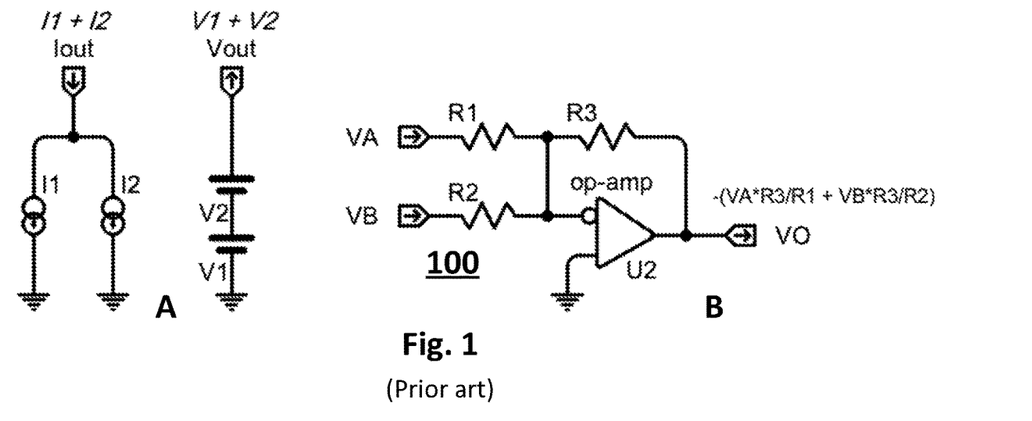
FIG. 1 is a diagram of circuits that add electronic properties and perform a form of multiplication as are known in the prior art.

FIG. 1 is a diagram of circuits that add electronic properties and perform a form of multiplication as are known in the prior art. Part A of FIG. 1 shows the trivial means for doing so either in the current domain, by joining the currents I1 and I2 flowing in two wires, or in the voltage domain, by placing two voltage elements V1 and V2 in series.

Part B of FIG. 1 is a diagram of a circuit 100 that performs a form of multiplication in the voltage domain as is known in the prior art. Input voltages VA and VB create different currents into a virtual ground configuration that sum into feedback resistor R3 and operational amplifier ("op-amp") U2. The output VO is given by:

$$VO = -\left(VA \cdot \frac{R3}{R1} + VB \cdot \frac{R3}{R2}\right) \quad \text{Equation 2}$$

This is both an addition and a multiplication of sorts; however, the multiplication is achieved by conversion from the voltage domain to the current domain and back to the voltage domain again. The multiplication action occurs in that transformation; the resistance, which is fixed at design time, is used to facilitate the multiplication. Further, the result is full multiplication of VA times VB, but rather those voltages are multiplied by R3/R1 and R3/R2, respectively. (To allow the resistance to be adjustable rather than fixed would require an active device as will be seen below in FIG. 2.)

Figure 2:
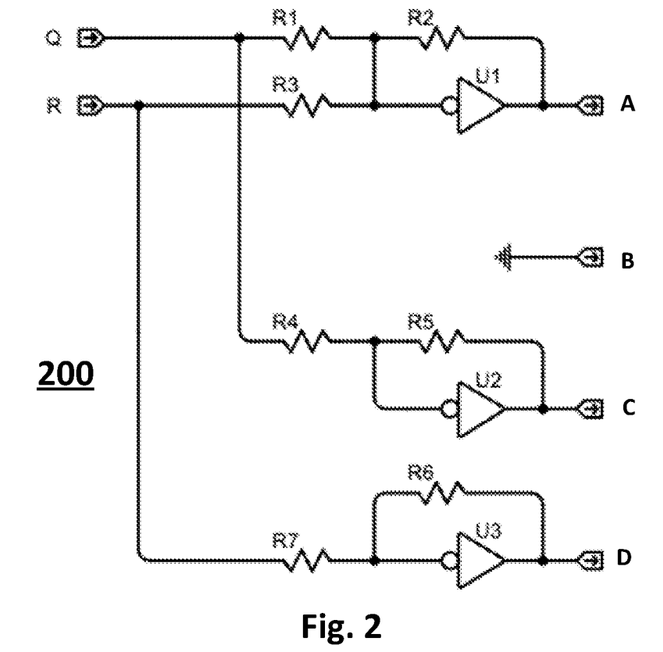
FIG. 2 is a diagram of a circuit for transforming a single ended voltage and a single-ended reference voltage into the signal domain according to one embodiment of the present approach.

FIG. 2 is a diagram of a circuit 200 for transforming a single-ended voltage Q and a single-ended reference voltage R into the signal domain according to one embodiment of the present approach. As above, the signal S is determined from the input voltage Q and reference voltage R, and defined by the four derived voltages A, B, C and D according to the expression of Equation 1, $$S = \frac{A - B + C - D}{A - B - C + D}.$$

Circuit 200 contains three instances of circuit 100 above (two instances are modified by removing a resistor since there is only one input voltage to those instances). In the single ended case, B is zero. All of the resistors R1 through R7 have the same value (unless otherwise noted, this will be true in all of the figures herein). Using Equation 2 above it will be seen that A=−(Q+R), C=−Q, and D=−R. Using these values, Equation 1 reduces to S=Q/R for circuit 200. As above, this signal is both shift and scale invariant, as any shift or scale in value that is applied to all of the derived output voltages A, B, C and D will cancel out in Equation 1 and the resulting signal will not change.

As illustrated, circuit 200 still contains some active components, i.e., inverting amplifiers U1, U2, and U3. As above, it will be advantageous to eliminate as many of these active devices as possible and instead rely primarily on passive components to achieve the maximum benefit of the present approach. As will be seen below, these active devices are not needed in the butterfly circuit constructed according to the present approach.

Figure 3:
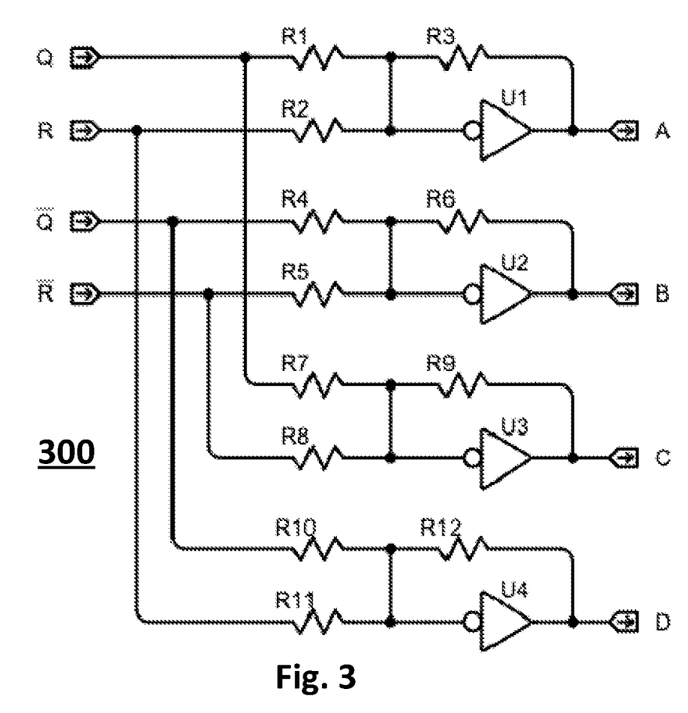
FIG. 3 is a diagram of a circuit for transforming a differential voltage and differential reference voltage into the signal domain according to one embodiment of the present approach.

This approach, and that of other circuits shown below as using single-ended signals, is easily extended to a differential signal. FIG. 3 is a diagram of a circuit for transforming a differential voltage and differential reference voltage into the signal domain according to one embodiment of the present approach. The input voltage is now a differential voltage Q-Qbar (in FIG. 3, Qbar is shown as a Q with a line over it), while the reference voltage is also a differential voltage R-Rbar (similarly, Rbar is an R with a line over it).

In circuit 300 there are now four instances of circuit 100 above, each receiving two input voltages. As above, all of the resistors R1 through R12 have the same value. Again using Equation 2 to find the derived values of A, B, C and D, it will be seen that A=−(Q+R), B=−(Qbar+Rbar), C=−(Q+Rbar), and D=−(Qbar+R). Using these values, Equation 1 reduces to:

$$S = \frac{Q - Qbar}{R - Rbar}$$

i.e., the differential input voltage divided by the differential reference voltage, as is expected.

Figure 4:
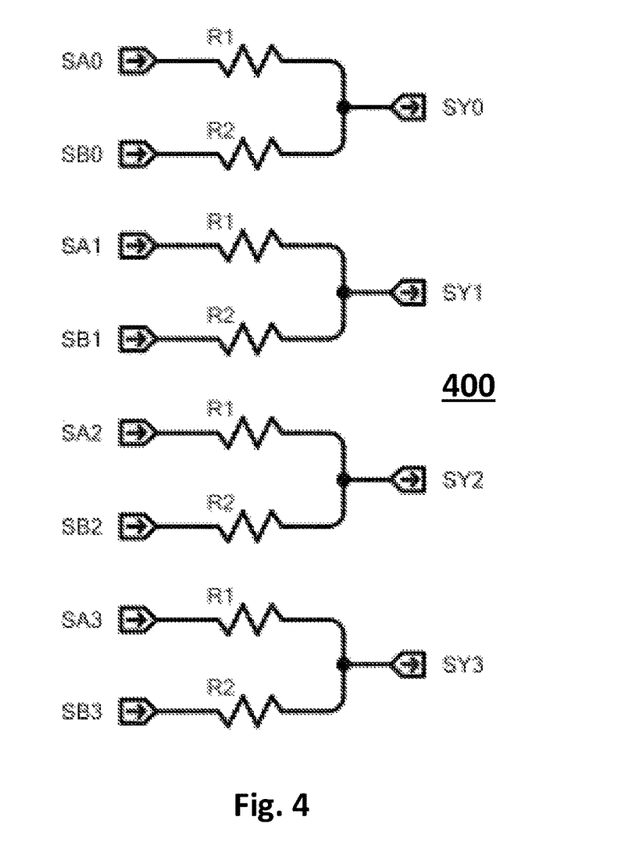
FIG. 4 is a diagram of a resistor network configured to combine two signals.

FIG. 4 is a diagram of a resistor network 400 configured to combine two signals SA and SB to create a signal SY, where SA, SB and SY are each created from four voltages as described above. Thus:

$$SA = \frac{SA0 - SA1 + SA2 - SA3}{SA0 - SA1 - SA2 + SA3}$$

Signals SB and SY may each be similarly represented by their four component voltages SB0 to SB3 and SY0 to SY3, respectively.

In each internal voltage case, the voltage components of the signal SA are connected through resistors having a resistance R1, while the voltage components of the signal SB are connected through resistors having a resistance R2. Thus, for example, the voltage on the node SY0 is given by:

$$SY0 = R1\|R2 \cdot \left(\frac{SA0}{R1} + \frac{SB0}{R2}\right)$$

where $\|$ is the parallel impedance operator indicating that resistances R1 and R2 are in parallel. To simplify what follows it is assumed that $$x = \frac{R1\|R2}{R1} \text{ and } y = \frac{R1\|R2}{R2}$$

so that, for example, SY0=x·SA0+y·SB0, etc.

As a result, it can be seen that:

$$SY = \frac{\begin{array}{c}x \cdot SA0 + y \cdot SB0 - x \cdot SA1 - \\ y \cdot SB1 + x \cdot SA2 + y \cdot SB2 - x \cdot SA3 - y \cdot SB3\end{array}}{\begin{array}{c}x \cdot SA0 + y \cdot SB0 - x \cdot SA1 - \\ y \cdot SB1 - x \cdot SA2 - y \cdot SB2 + x \cdot SA3 + y \cdot SB3\end{array}}$$

and thus $$SY = \frac{x \cdot (SA0 - SA1 + SA2 - SA3) + y \cdot (SB0 - SB1 + SB2 - SB3)}{x \cdot (SA0 - SA1 - SA2 + SA3) + y \cdot (SB0 - SB1 - SB2 + SB3)}$$

If (SA0−SA1−SA2+SA3)=(SB0−SB1−SB2+SB3), call this term (S0−S1−S2+S3); then:

$$SY = \frac{x \cdot (SA0 - SA1 + SA2 - SA3) + y \cdot (SB0 - SB1 + SB2 - SB3)}{(x+y) \cdot (S0 - S1 - S2 + S3)}$$

$$SY = \frac{x \cdot (SA0 - SA1 + SA2 - SA3)}{(x+y) \cdot (S0 - S1 - S2 + S3)} + \frac{y \cdot (SB0 - SB1 + SB2 - SB3)}{(x+y) \cdot (S0 - S1 - S2 + S3)}$$

$$SY = \frac{x \cdot SA}{(x+y)} + \frac{y \cdot SB}{(x+y)}$$

Recall that $$x = \frac{R1\|R2}{R1} = \frac{R2}{R1+R2} \text{ and } y = \frac{R1\|R2}{R2} = \frac{R1}{R1+R2};$$

thus:

$$x + y = \frac{R2 + R1}{R1 + R2} = 1$$

and therefore:

SY=x·SA+y·SB        Equation 3

Thus, the output signal SY from the resistor network 400 is the weighted sum of the two input signals SA and SB, if the condition (SA0−SA1−SA2+SA3)=(SB0−SB1−SB2+SB3) is true.

A sequence of such weighted sums can be created if the output impedance of a network that feeds to a subsequent network can be used as part of the subsequent network's input impedance.

Figure 5:
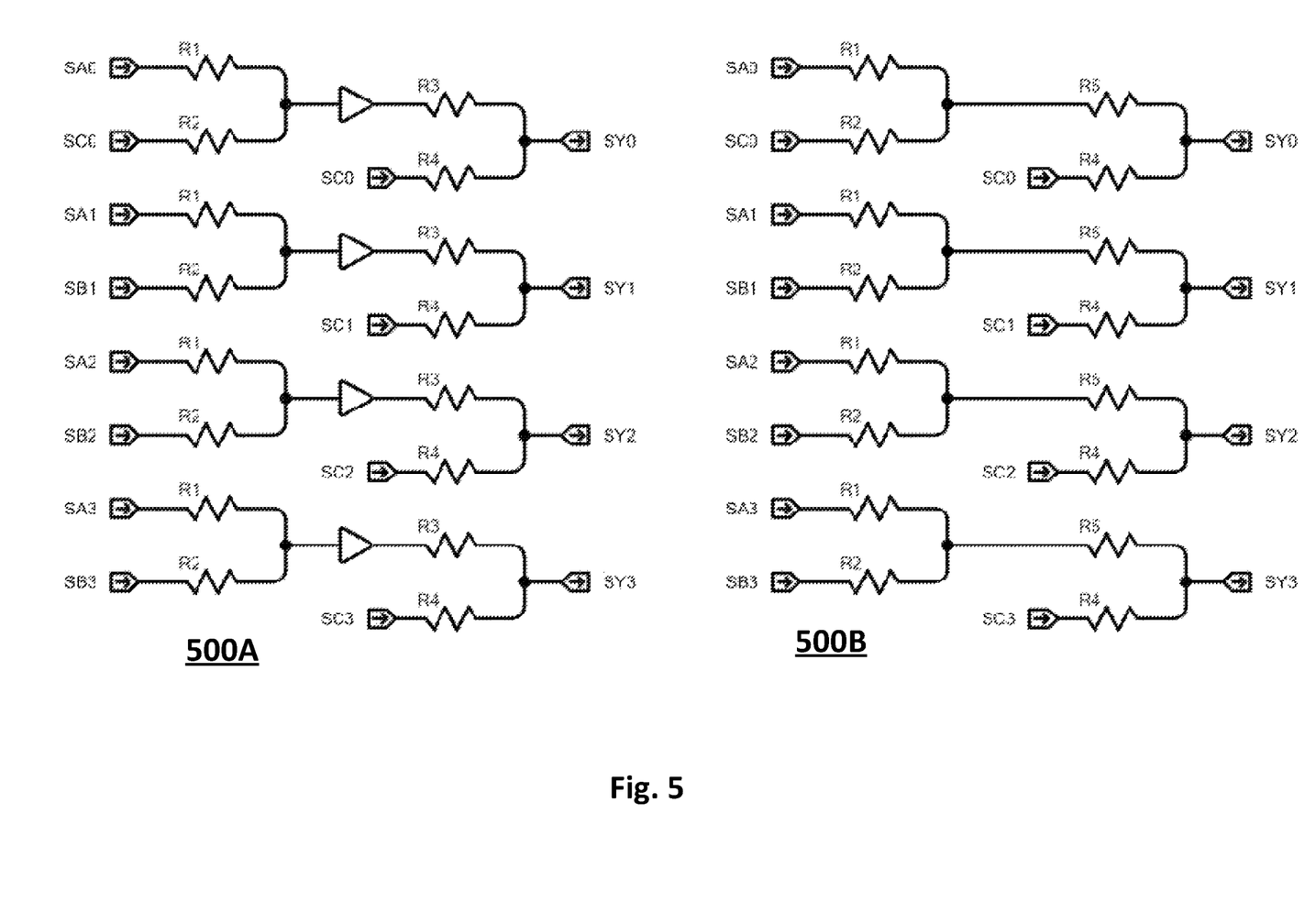
FIG. 5 is a diagram of two resistor networks configured to perform sequential combinations of signals.

FIG. 5 is a diagram of two resistor networks 500A and 500B configured to perform sequential combinations of signals. In circuit 500A, two signals SA and SB are added as in circuit 400 of FIG. 4. That weighted output is then buffered to remove the effects of the resistances R1 and R2, and then passed through resistances R3 to be added to a signal SC that is passed through resistances R4. The addition of the SA and SB signal, now weighted again by resistances R3, to the weighted SC signal creates an output signal SY.

However, circuit 500A can be simplified. The effects of the parallel resistances R1 and R2 can be removed by replacing resistances R3 with resistances R5, such that the resistance R5 is equal to the resistance R3 minus the parallel resistance of R1 and R2 as shown in circuit 500B.

Using these principles, a fast Fourier transform (FFT) circuit can be constructed from only passive components. While resistors and voltages are illustrated herein, those of skill in the art will recognize that capacitors, inductors, memristors, and even the on resistance of FET devices at a given bias point, or similar two port elements can be used with other analog circuit properties.

Figure 6:
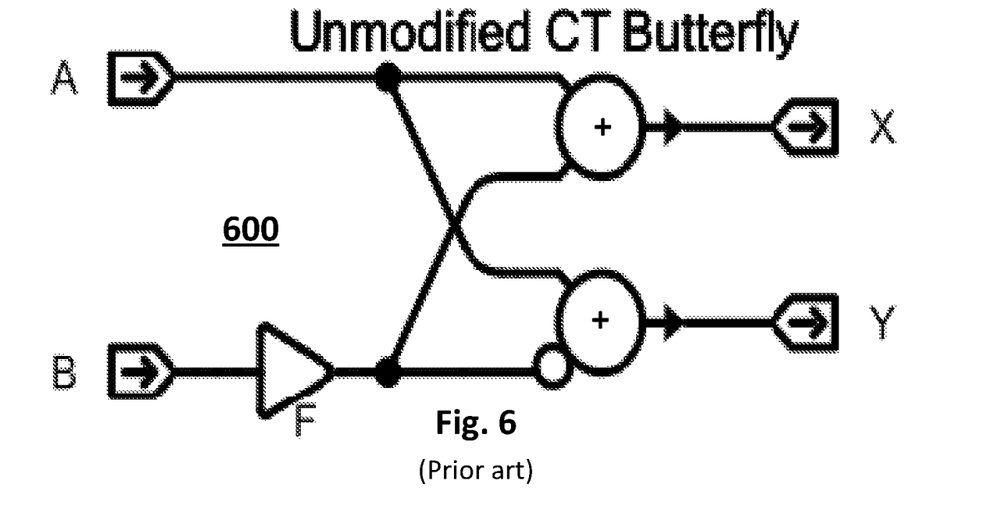
FIG. 6 is a diagram of an unmodified Cooley-Tukey (CT) butterfly used in fast Fourier transforms according to the prior art.

FIG. 6 is a diagram of a common prior art butterfly circuit 600 used in FFT processing, known as the unmodified Cooley-Tukey (CT) butterfly, for performing what is known as a Radix-2 decimation in time algorithm, part of a FFT. In the unmodified CT butterfly, two complex inputs A and B are received. Each butterfly operation consists of modifying one input (here B) by multiplying it by a twiddle factor F (as above, one of the nth roots of −1) and then adding the result to the other input (here A) while also calculating the difference between the modified input and the unmodified input, resulting in two outputs X and Y.

However, in the unmodified CT algorithm, there is an asymmetry in the butterfly operation, i.e., in the butterfly circuit 600 of FIG. 6 the twiddle factor F is applied to only one input (here B) and not the other (A). This results in a mismatch in timing, as the A signal arrives at the adders before the B signal due to the time required to multiply the B signal by the twiddle factor F.

Figure 7:
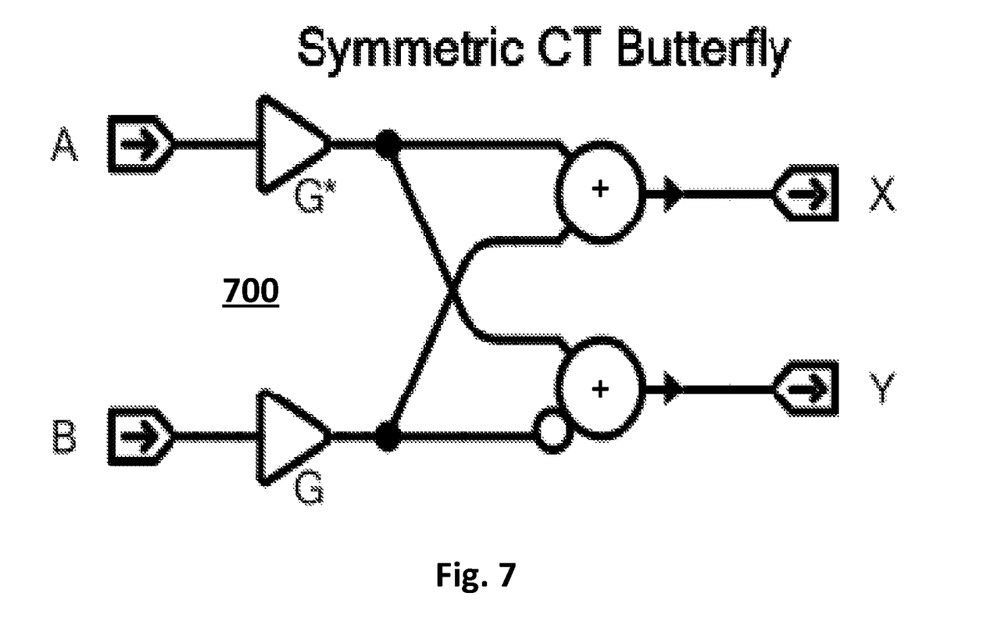
FIG. 7 is a diagram of a butterfly circuit for use in a fast Fourier transform according to one embodiment of the present approach.

FIG. 7 is a diagram of a butterfly circuit 700 for use in a FFT according to one embodiment of the present approach. In this embodiment of the present approach, a slightly modified twiddle factor G is applied to one input, and its complex conjugate, G*, is applied to the other input. The two modified inputs are added together and their difference is calculated, again resulting in two outputs X and Y.

Using two related twiddle factors G and G* preserves the symmetry in the circuit. It also in turn allows both matched output impedances as discussed above and allows the condition (SA0−SA1−SA2+SA3)=(SB0−SB1−SB2+SB3) to be met in the passive network.

To represent a complex signal using the methodology described above, eight voltages are needed, four for the real part of the signal and four for the imaginary part. The formulation, (using $i \equiv \sqrt{-1}$), is $S = S_r + i*S_i$ where $S_r$ is the real part of the signal and $S_i$ is the imaginary part. In full:

$$S = S_r + i*S_i = \tag{Equation 4}$$
$$\frac{S[0] - S[1] + S[2] - S[3]}{S[0] - S[1] - S[2] + S[3]} + i\left(\frac{S[4] - S[5] + S[6] - S[7]}{S[4] - S[5] - S[6] + S[7]}\right).$$

With a complex signal formulated in this way, a weighted sum of complex quantities with complex coefficients can be created. The complex equivalent of Equation 1 above is:

$$S_{rx} = x_r \cdot S_{ra} - x_i \cdot S_{ia} + y_r \cdot S_{rb} - y_i \cdot S_{ib} S_{ix} = x_i \cdot S_{ra} + x_r \cdot S_{ia} + y_i \cdot S_{rb} + y_r \cdot S_{ib}$$

Equation 5

Equation 5 shows how the complex output X in FIG. 7 is created. However, x is the complex conjugate of y in the symmetric butterfly of FIG. 7. Thus, substituting G for y results in:

$y_r = G_r$
$y_i = G_i$
$x_r = G_r$
$x_i = -G_i$ and thus:

$$S_{rx} = G_r \cdot S_{ra} + G_i \cdot S_{ia} + G_r \cdot S_{rb} - G_i \cdot S_{ib} S_{ix} = -G_i \cdot S_{ra} + G_r \cdot S_{ia} + G_i \cdot S_{rb} + G_r \cdot S_{ib} \quad \text{Equation 6X}$$

$$S_{ry} = G_r \cdot S_{ra} + G_i \cdot S_{ia} - G_r \cdot S_{rb} + G_i \cdot S_{ib} S_{iy} = -G_i \cdot S_{ra} + G_r \cdot S_{ia} - G_i \cdot S_{rb} - G_r \cdot S_{ib}; \quad \text{Equation 6Y}$$

These equations 6X and 6Y above show how the output signals X and Y are created from input signals A and B in the symmetric butterfly operation in circuit 700 of FIG. 7.

Equations 6X and 6Y are more clearly expressed in matrix form in Equation 7 below. Referring to circuit 700 of FIG. 7, the column vector on the left is the real and imaginary parts of the X and Y output signals, the column vector on the right is the real and imaginary parts of the A and B input signal. The transformation matrix is populated by the real and imaginary parts of the symmetric twiddle factor G.

$$\begin{pmatrix} S_{rx} \\ S_{ix} \\ S_{ry} \\ S_{iy} \end{pmatrix} = \begin{pmatrix} G_r & G_i & G_r & -G_i \\ -G_i & G_r & G_i & G_r \\ G_r & G_i & -G_r & G_i \\ -G_i & G_r & -G_i & -G_r \end{pmatrix} \begin{pmatrix} S_{ra} \\ S_{ia} \\ S_{rb} \\ S_{ib} \end{pmatrix} \quad \text{Equation 7}$$

Figure 8:
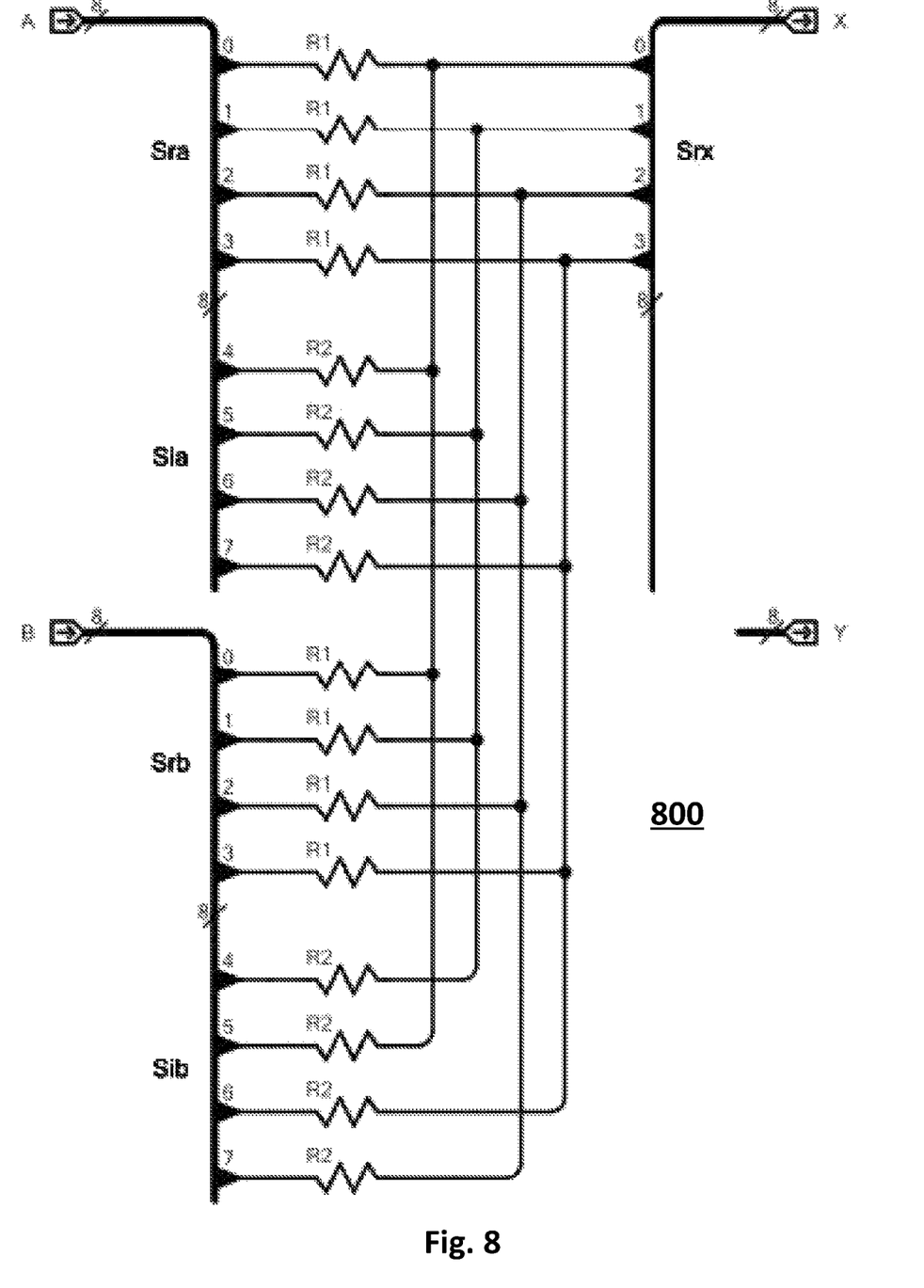
FIG. 8 is a diagram of a passive network corresponding to the top row of a transformation matrix according to one embodiment of the present approach.

FIG. 8 is a diagram of a passive network 800 corresponding to the top row of the transformation matrix of Equation 5. The resistance value R1 corresponds (as will be explained below) to $G_r$ and the resistance value R2 corresponds to $G_i$. Note that $-G_i$ is created by pair-wise swapping the wires 4-7 that come from $S_{ib}$.

Figure 9:
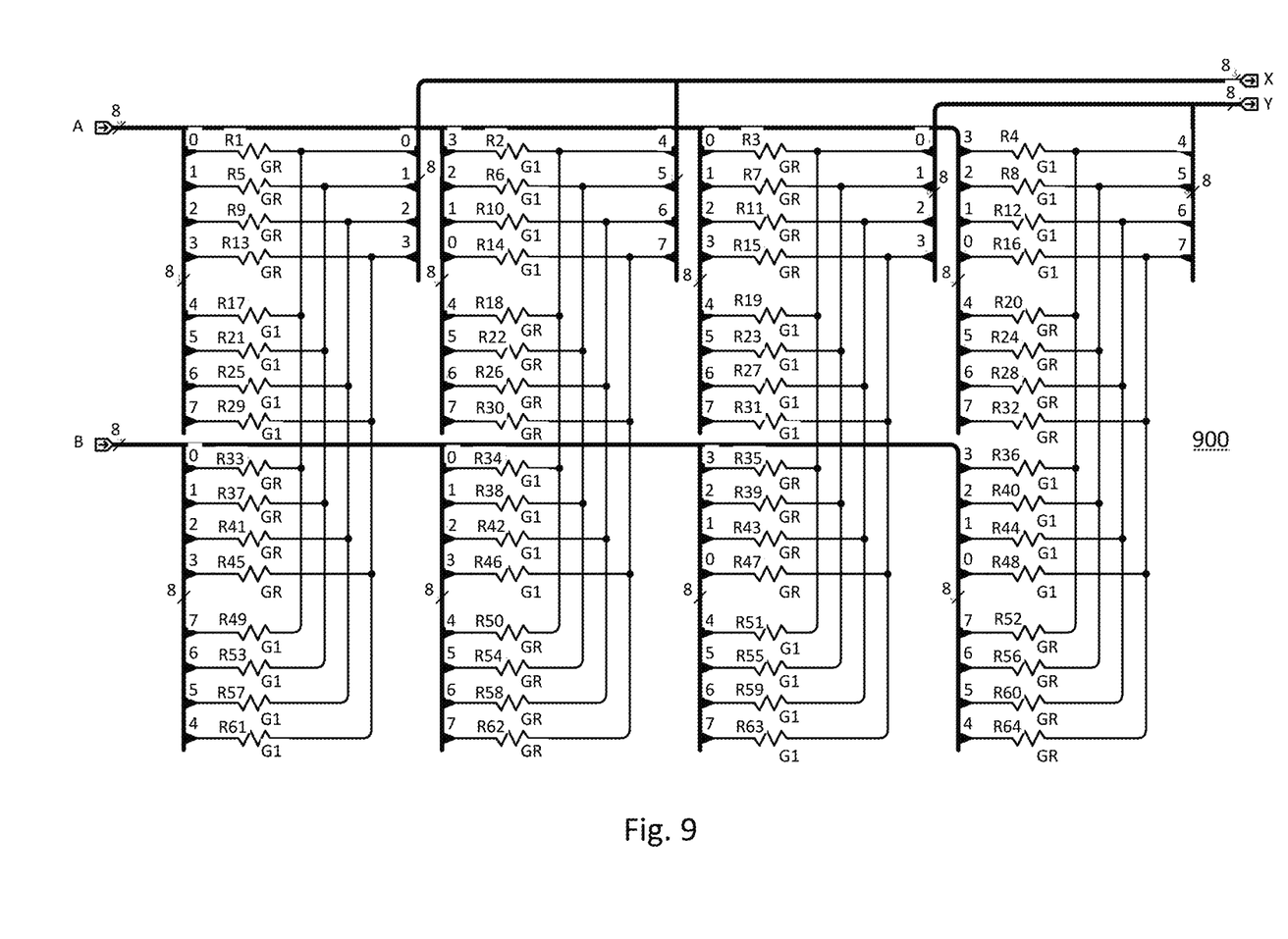
FIG. 9 is a diagram of a passive network corresponding to an entire transformation matrix according to one embodiment of the present approach.

FIG. 9 is a diagram of a passive network 900 corresponding to the entire transformation matrix of Equation 7. Network 900 follows the same principles of network 800 of FIG. 8, with each column of resistors in network 900 corresponding to a row of the transformation matrix of Equation 7. Network 900 represents one instance of a symmetric butterfly operation of the FFT.

The resistor values in network 900 are now set by the parameters $G_r$ and $G_i$ passed to the specific instance of network 900. Where a negative term is needed, this is now indicated by the resistor numbers; for example, in this FIG. 9, the bottom left group of resistors (R49, R53, R57 and R61) are not ordered 4, 5, 6, and 7 as may be expected, but are rather ordered 7, 6, 5, and 4 (instead of being pairwise swapped as in FIG. 8 above) which, due to the formulation of Equation 2 above, corresponds to a sign reversal.

Figure 10:
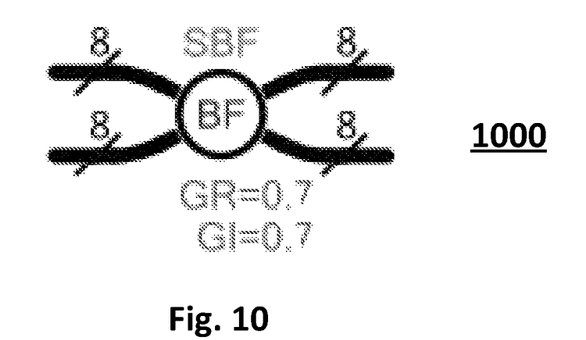
FIG. 10 is an illustration of an icon representing a single symmetric butterfly operation of the passive network of FIG. 9.

FIG. 10 is an illustration of an icon representing the single symmetric butterfly operation of network 900 of FIG. 9. The network 900 is indicated in FIG. 10 as "BF" (butterfly) and shows two input signals of 8 parts each and two output signals of 8 parts each.

As is known in the art and discussed above, a FFT breaks a DFT down into smaller DFTs, the smallest of which is performed by the Radix-2 butterfly. Thus, it will be apparent to one of skill in the art that the butterfly network 900 of FIG. 9 may be repeated as many times as necessary to achieve a FFT of any desired size. Each butterfly network will have different coefficients and thus different resistor values $G_r$ and $G_i$ as determined by the specific twiddle factor G and its conjugate G* desired for that butterfly.

Figure 11:
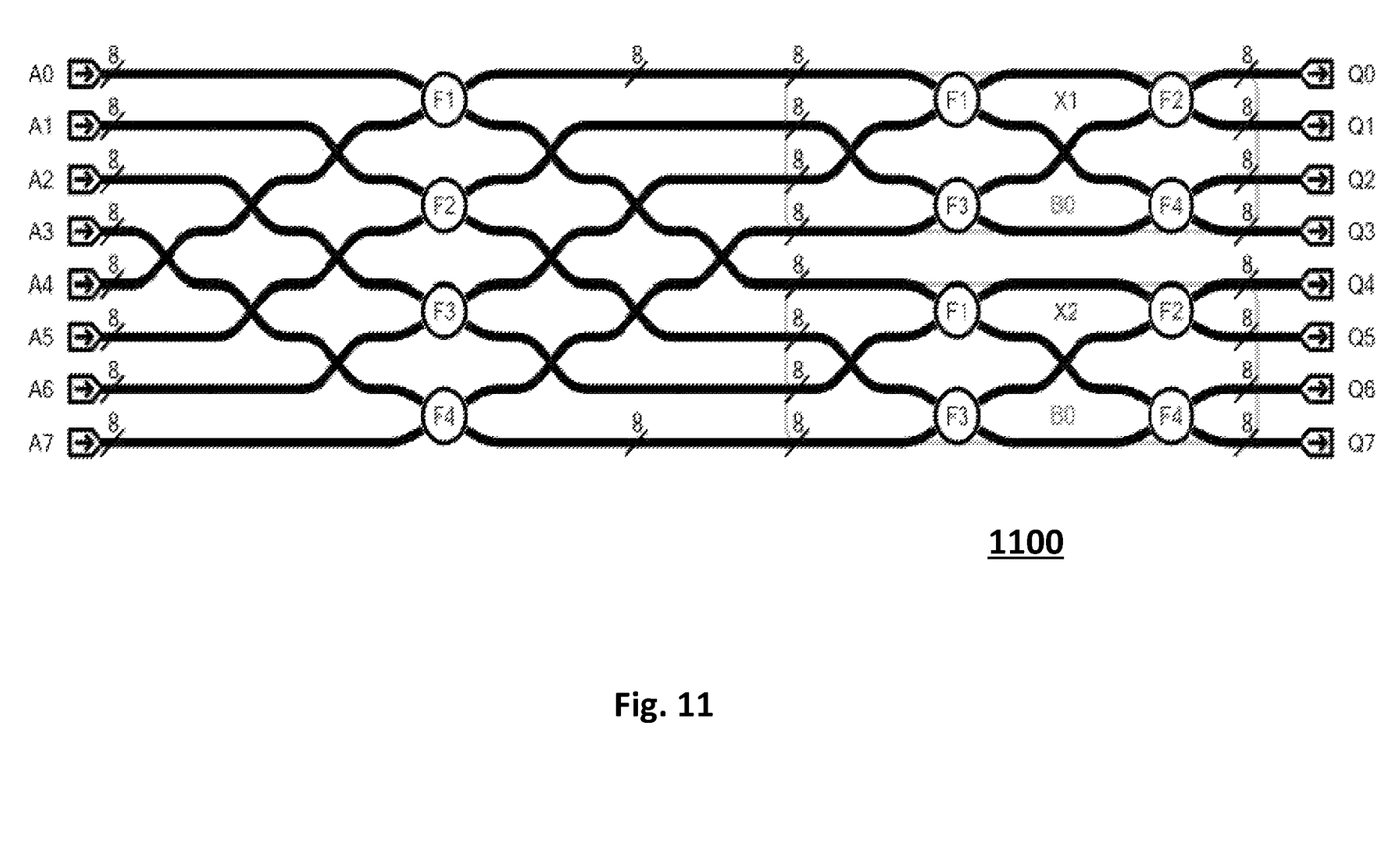
FIG. 11 is a diagram of a FFT processor having 8 inputs and 8 outputs according to one embodiment of the present approach.

FIG. 11 is a diagram of a FFT processor 1100 having 8 inputs and 8 outputs according to one embodiment of the present approach. The structure of processor 1100 will be known to one of skill in the art, with the exception that each butterfly circuit is an instance of circuit 900 above and thus has two signals having 8 parts each and two output signals having 8 parts each. A first column of eight butterfly circuits feeds a second column of two groups of four butterfly circuits, which in turn feed two columns of four groups of two butterfly circuits.

Figure 12:
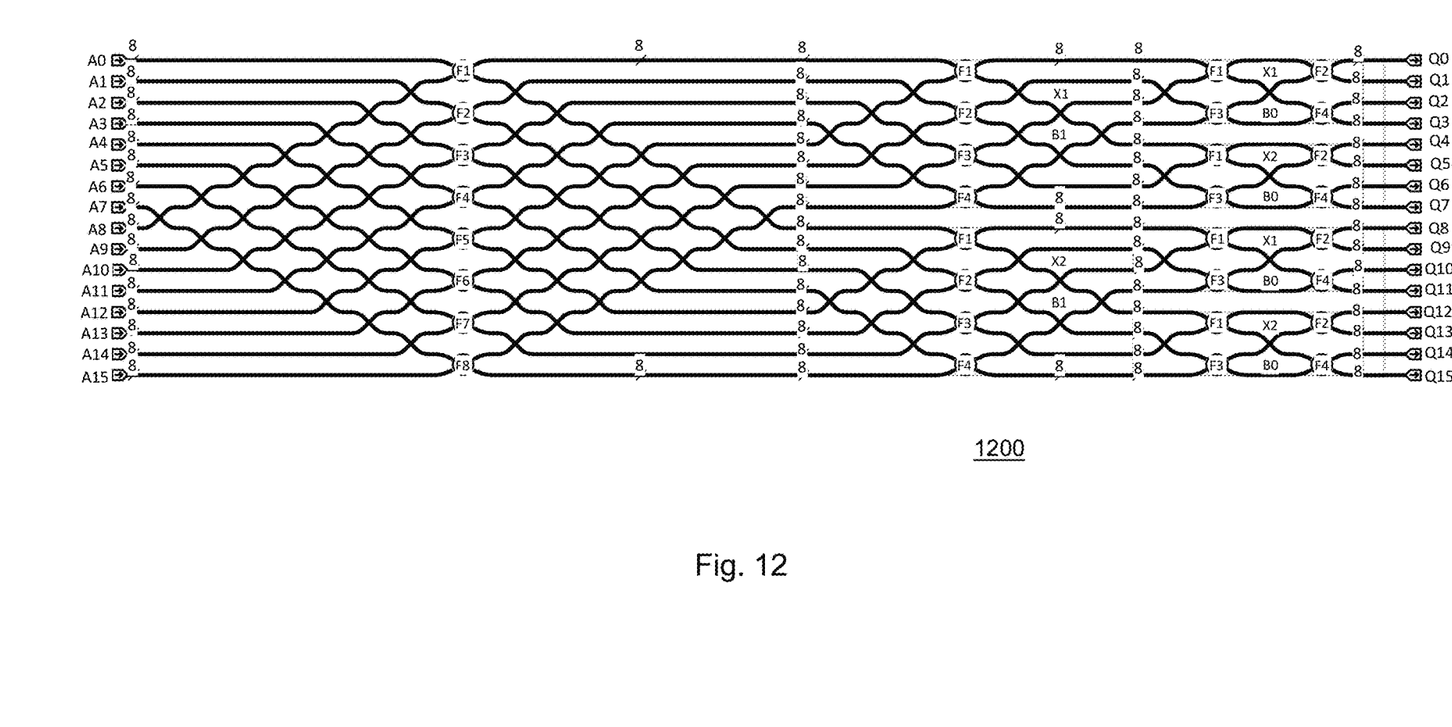
FIG. 12 is a diagram of a FFT processor having 16 inputs and 16 outputs according to one embodiment of the present approach.

FIG. 12 is a diagram of a FFT processor 1200 having 16 inputs and 16 outputs according to one embodiment of the present approach. Again, as will be apparent to one of skill in the art in light of the teachings herein, a first column of eight butterfly circuits now feeds two instances of the 8 input FFT processor 1100 of FIG. 11. It will be apparent to one of skill in the art in light of the teachings herein how this principle may be extended to create a FFT processor having any power of two number of inputs. FFT processor 1200 is drawn such that the sequence of inputs and outputs is in order to aid visualization of its structure, but as is known in the art it is not necessary to place the inputs and outputs in such order.

As above, each butterfly circuit in the hierarchical FFT is an instance of the circuit 900 of FIG. 9, and thus contains the elements of a 4×4 transformation matrix. As below, certain of the transformation matrices have $G_r \equiv 1$ and $G_i \equiv 0$, in which cases the 64 resistors for the entire matrix may be omitted. Generally, for an FFT processor of width $2^N$, of the total $N \cdot 2^{N-1}$ instances there are $2^N - 1$ instances where no resistors are needed, so that the total resistor count is:

$$64 \cdot (N \cdot 2^{N-1} - 2^N + 1) = 64 \cdot (2^{N-1} \cdot (N-2) + 1).$$

Thus, for example, in FIG. 12 where N=4, there are 1088 resistors in 17 instances of circuit 800 where resistors are needed, rather than 2048 resistors that would be needed if all 32 instances of circuit 800 required resistors.

Appendix 1 contains a LISP programming code implementation of the symmetric CT radix-2 Decimation in Time ("DIT") algorithm. Sections of the LISP programming code that are in bold indicate differences between the symmetrical butterfly of the present approach and the asymmetric butterfly of the prior art.

Referring again to FIG. 12, which is an example of a FFT processor with N=4, consider the right most column as column 0, and the left most column as column 3. The form of transformation in the right most column 0 occurs once and repeats $2^{N-1}$ times, the transformation in the next column 1 appears in two distinct forms and repeats $2^{N-2}$ times, the transformation in column two has four distinct forms and repeats $2^{N-3}$ times, etc.

From the LISP programming code example, it may be seen that column 0 corresponds to the recursive call with length N equal to two, column 1 with length four, column 2 length eight, etc. Within each recursive call the Nth root of −1 is calculated (in the line WN=(expt −1.0 (/N)), the first operation begins with W=1 and thereafter W rotates by that nth root (in the line (setq W (* W WN))).

The LISP programming code example makes extensive use of LISP's mathematical completeness and corresponding type coercion in that many of the variables are complex quantities, such as, for example, the calculation of the nth root of −1.

The amplitude of the nth root of −1 is unity, and thus multiples of the nth root of −1 are conveniently considered to be rotations in the complex plane. The symmetric butterfly circuit of FIG. 9 is therefore performing a pair of complex rotations, one clockwise and one anticlockwise.

Each recursive call of a different length has a different nth root of −1, but all start at W=1. Due to the symmetry, the W values rotate in opposite directions, with W rotating anti-clockwise and the conjugate rotating clockwise. The loop runs for N/2 cycles (terminating due to the recursive call to the odd and even FFT1S function which return lengths half of the current N value). Thus, the nth-root multiplication never quite reaches π/2: W and its conjugate spread out from unity towards the complex axis but are one iteration short of having zero in the real part.

Using $W_{ci}$ to indicate the weight in column 'c' (horizontal in Table 1 below) and the index 'i' of the values (vertical in Table 1 below);

$$W_{ci} = \sqrt[2^{c+1}]{-1}^{i}.$$

The values required for the example of FIG. 12 are shown in Table 1. The column 'Angle' or A below is the phase of the unit amplitude complex number in radians.

The values of the resistors are created from the complex rotation as the inverse of the real and imaginary part plus an amplitude compensation factor such that the sum of the real and imaginary number is unity. For example, if the complex rotation is $G=1=G_r+i\cdot G_i$ then:

$$R_{GR} = \frac{R}{G_r(G_r + G_i)}$$

$$R_{GI} = \frac{R}{G_{ir}(G_r + G_i)}$$

where R is an arbitrary factor that sets the impedance level. The angle A alone may be conveniently used since the amplitude of the twiddle factors are unity, in which case $G_r=\cos(A)$ and $G_i=\sin(A)$. Thus, only the single parameter A is needed to represent both the real and imaginary parts of G.

As noted in FIG. 5, the output impedance of the prior column adds to the impedance seen at the input of each subsequent column, which may be compensated for in the calculation of the next column. Note from FIG. 9 that any output node has an impedance level of $$\frac{R_{GR}\|R_{GI}}{2}.$$

Using Z to denote the output impedance of the prior stage results in:

$$R_{GR} = \frac{R}{G_r(G_r + G_i)} - Z$$

$$R_{GI} = \frac{R}{G_i(G_r + G_i)} - Z$$

$$R_{GR} = \frac{R}{\cos(A)(\cos(A) + \sin(A))} - Z$$

$$R_{GI} = \frac{R}{\sin(A)(\cos(A) + \sin(A))} - Z$$

Thus, the four parameters of any instance of the symmetric butterfly may be stated as A, ZA, ZB and B.

Figure 13:
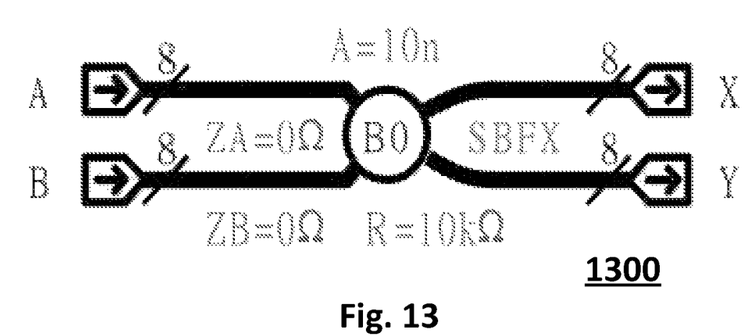
FIG. 13 is an illustration of another icon representing a single symmetric butterfly operation of the passive network of FIG. 9.

FIG. 13 is another illustration of an icon 1300 representing the single symmetric butterfly operation of network 900 of FIG. 9, modified from the representation in FIG. 10 to indicate the parameters of the specific instance of the butterfly. Note that ZA is the output impedance driving the A port, and ZB is the output impedance driving the B port; these are indicated at 0 ohms, and can be assumed to be very near 0, due to the impedance matching between networks mentioned above. The default value of A is not set to zero here so that the calculation of the resistor value does not go to infinity, but is arbitrarily set to 1e-8, or $1^{-8}$ or 10 nano. The output impedance of the butterfly circuit, i.e., $$\frac{R_{GR}\|R_{GI}}{2},$$

is:

$$Z = \frac{R}{\sin(A)(\cos(A) + \sin(A))} \left\| \frac{R}{\cos(A)(\cos(A) + \sin(A))} \right. = \frac{R}{2\sin(A)\cos(A)}$$

Figure 14:
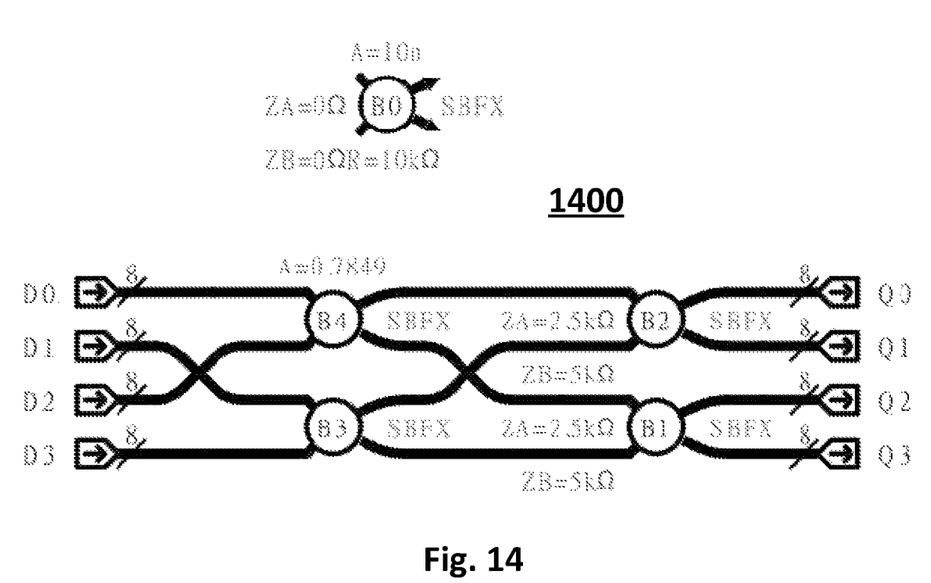
FIG. 14 is a diagram of a FFT processor having 4 inputs and 4 outputs according to one embodiment of the present approach.

FIG. 14 is a diagram of a complete FFT processor 1400 for a small number of input and output bins (four in this example). Butterfly elements B1 through B4 take on the values of the prototype instance B0 unless otherwise shown. The output impedance of B4 is 2.5 kilohms, while the output impedance of B3 is 5 kilohms. Butterfly elements B1 and B2 are set accordingly The angle (A) on butterfly elements B1 and B2 is the same very small default value (from B0) of 10n; this causes the resistor value, which would otherwise be infinite, to be large but not infinite. In this simple example butterfly element B4 has a non-default angle corresponding to Row 1 of Column 1 in the Table 1.

The disclosed system has been explained above with reference to several embodiments. Other embodiments than the specific circuits described herein will be apparent to those skilled in the art in light of this disclosure.

Certain aspects of the described method and apparatus may readily be implemented using configurations other than those described in the embodiments above, or in conjunction with elements other than or in addition to those described above. For example, as is well understood by those of skill in the art, the analog property on which the formulation is invoked, here described always as a voltage, could also be a current, charge or other circuit property. All the advantages of fast settling time and scale and shift invariance may be exploited in the current domain by reference to the analogous voltage mode disclosed herein. Further, the illustration of resistors is exemplary; one of skill in the art appreciate that other two-port elements may be used and will be able to select the appropriate number and configuration of resistors or other elements that is appropriate for a particular application.

These and other variations upon the embodiments are intended to be covered by the present disclosure, which is limited only by the appended claims.

APPENDIX 1

LISP Implementation of Symmetric CT Radix-2 Decimation in Time Algorithm

```
(defun FFT1S (A)
  (let ( ( N (length A) ) )
    (if (= N 1) A
      (loop
         for x in A
         for i from 0
         when (evenp i) collect x into Aeven
         else collect x into Aodd
         finally
         (return
           (loop
              with WN = (expt -1.0 (/ N) )
              with W = 1
              for Yeven in (FFT1S Aeven)
              for Yodd in (FFT1S Aodd)
              collect (+ (* (conjugate W) Yeven) (* W Yodd) ) into Low
              collect (- (* (conjugate W) Yeven) (* W Yodd) ) into High
              do
              (setq W (* W WN) )
              finally (return (append Low High) ) ) ) ) ) ) )
```

TABLE 1

| | | Column Index | | |
|---|---|---|---|---|
| | 0 | 1 | 2 | 3 |
| | | | NthRoot − 1 | |
| Row | 0 + 1i | 0.707 + 0.707i | 0.924 + 0.383i | 0.981 + 0.195i | Angle |
| 0 | 1 + 0i | 1 + 0i | 1 + 0i | 1 + 0i | 0.0000 |
| 1 | | 0.707 + 0.707i | 0.924 + 0.383i | 0.981 + 0.195i | 0.1962 |
| 2 | | | 0.707 + 0.708i | 0.924 + 0.383i | 0.3924 |
| 3 | | | 0.382 + 0.925i | 0.832 + 0.556i | 0.5887 |
| 4 | | | | 0.708 + 0.707i | 0.7849 |
| 5 | | | | 0.557 + 0.832i | 0.9811 |
| 6 | | | | 0.384 + 0.925i | 1.1773 |
| 7 | | | | 0.196 + 0.982i | 1.3735 |

What is claimed is:

1. A circuit configured to perform a butterfly operation on a first complex input signal and a second complex input signal and output a first complex output signal and a second complex output signal, each input and output signal defined by eight analog circuit properties, four of the analog circuit properties of each input or output signal defining a real part of the respective input or output signal and four of the analog circuit properties of each input or output signal defining an imaginary part of the respective input or output signal, the circuit comprising:
   a first plurality of passive two-port elements configured to receive the eight analog circuit properties of the first complex input signal and the eight analog circuit properties of the second complex input signal and generate the four analog circuit properties defining the real part of the first complex output signal;
   a second plurality of passive two-port elements configured to receive the eight analog circuit properties of the first complex input signal and the eight analog circuit properties of the second complex input signal and generate the four analog circuit properties defining the imaginary part of the first complex output signal;
   a third plurality of passive two-port elements configured to receive the eight analog circuit properties of the first complex input signal and the eight analog circuit properties of the second complex input signal and generate the four analog circuit properties defining the real part of the second complex output signal;
   a fourth plurality of passive two-port elements configured to receive the eight analog circuit properties of the first complex input signal and the eight analog circuit properties of the second complex input signal and generate the four analog circuit properties defining the imaginary part of the second complex output signal;
   wherein values of the passive two-port elements in each of the four pluralities of passive two-port elements are defined such that:
      the first complex output signal is a sum of the first complex input signal multiplied by a twiddle factor and the second complex input signal multiplied by a conjugate of the twiddle factor; and
      the second complex output signal is a difference between the first complex input signal multiplied by the twiddle factor and the second complex input signal multiplied by the conjugate of the twiddle factor.

2. The circuit of claim 1 wherein each plurality of passive two-port elements comprises sixteen passive two-port elements configured such that each of the sixteen passive two-port elements receives a different one of the circuit properties defining the first complex input signal and the second complex input signal.

3. The circuit of claim 1 wherein the passive two-port elements are resistors.

4. The circuit of claim 1 wherein the passive two-port elements are capacitors.

5. The circuit of claim 1 wherein the passive two-port elements are inductors.

6. The circuit of claim 1 wherein the analog properties are voltages.

7. The circuit of claim 1 wherein the analog properties are currents.

8. The circuit of claim 1 wherein the analog properties are charges.

9. A method of performing a butterfly operation on a first complex input signal and a second complex input signal to produce a first complex output signal and a second complex output signal, each input and output signal defined by eight analog circuit properties, four of the analog circuit properties of each input or output signal defining a real part of the signal and four of the analog circuit properties of each input or output signal defining an imaginary part of the respective input or output signal, the method comprising:
   generating the four analog circuit properties defining the real part of the first complex output signal by passing the eight analog circuit properties of the first complex input signal and the eight analog circuit properties of the second complex input signal through a first plurality of passive two-port elements;
   generating the four analog circuit properties defining the imaginary part of the first complex output signal by passing the eight analog circuit properties of the first complex input signal and the eight analog circuit properties of the second complex input signal through a second plurality of passive two-port elements;
   generating the four analog circuit properties defining the real part of the second complex output signal by passing the eight analog circuit properties of the first complex input signal and the eight analog circuit properties of the second complex input signal through a third plurality of passive two-port elements;
   generating the four analog circuit properties defining the imaginary part of the second complex output signal by passing the eight analog circuit properties of the first complex input signal and the eight analog circuit properties of the second complex input signal through a fourth plurality of passive two-port elements;

wherein values of the passive two-port elements are selected such that:

the first complex output signal is a sum of the first complex input signal multiplied by a twiddle factor and the second complex input signal multiplied by a conjugate of the twiddle factor; and the second complex output signal is a difference between the first complex input signal multiplied by the twiddle factor and the second complex input signal multiplied by the conjugate of the twiddle factor.

10. The method of claim 9 wherein each plurality of passive two-port elements comprises sixteen two-port elements configured such that each of the sixteen two-port elements receives a different one of the circuit properties defining the first complex input signal and the second complex input signal.

11. The method of claim 9 wherein the passive two port elements are resistors.

12. The method of claim 9 wherein the passive two port elements are capacitors.

13. The method of claim 9 wherein the passive two port elements are inductors.

14. The method of claim 9 wherein the analog properties are voltages.

15. The method of claim 9 wherein the analog properties are currents.

16. The method of claim 9 wherein the analog properties are charges.

* * * * *